Figure 4:
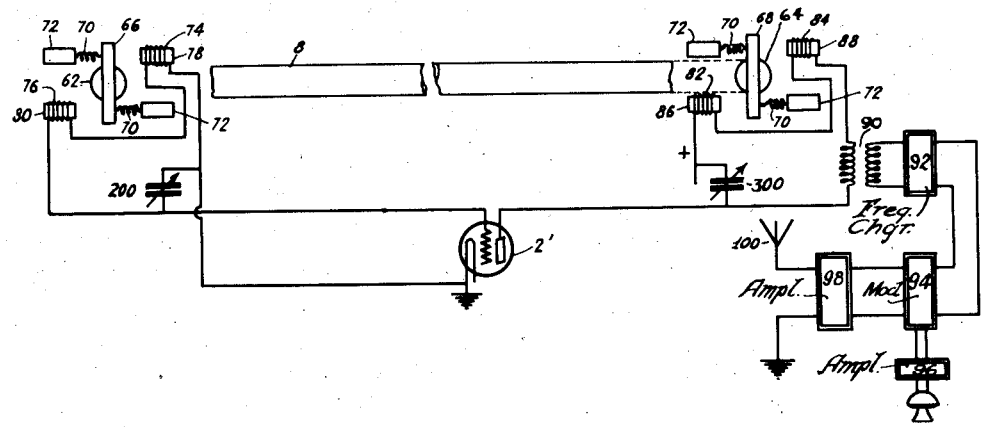

May 14, 1935.   C. W. HANSELL   2,001,132
OSCILLATION GENERATION
Filed July 18, 1930   2 Sheets-Sheet 1
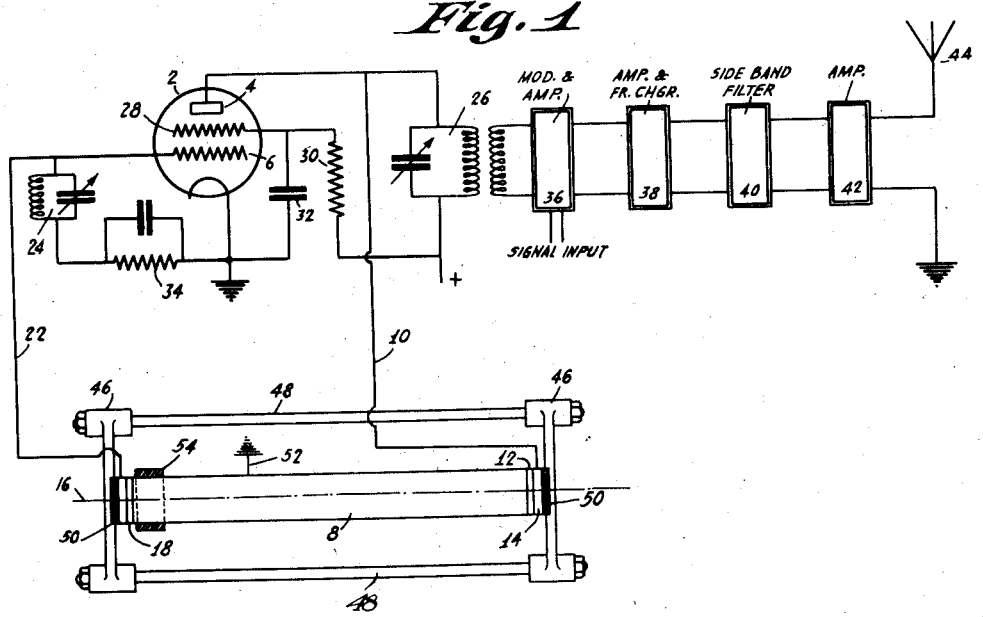
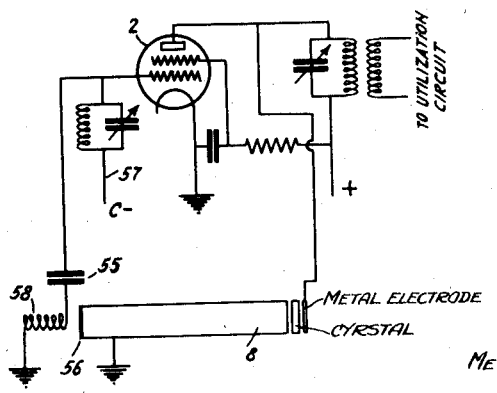
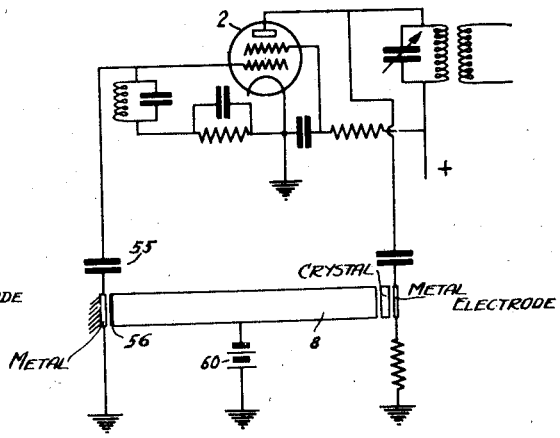
INVENTOR
CLARENCE W. HANSELL
BY
ATTORNEY May 14, 1935.  C. W. HANSELL  2,001,132
OSCILLATION GENERATION
Filed July 18, 1930  2 Sheets-Sheet 2

INVENTOR
CLARENCE W. HANSELL
BY
ATTORNEY

Patented May 14, 1935

2,001,132

UNITED STATES PATENT OFFICE 2,001,132

OSCILLATION GENERATION

Clarence W. Hansell, Port Jefferson, N. Y., assignor to Radio Corporation of America, a corporation of Delaware Application July 18, 1930, Serial No. 468,890

7 Claims. (Cl. 250—36)

This invention relates to electrical oscillation generation and has as an object the provision, in apparatus for transforming direct electrical energy to alternating energy, of methods and means whereby a portion of the transformed direct energy is transformed into mechanical wave energy which in turn is utilized to control and stabilize the frequency, to a predetermined value, of the alternating energy generated by the apparatus.

It has been proposed by James L. Finch and James W. Conklin in their Patent No. 1,945,545, granted February 6, 1934, to couple the anode and control electrode of a vacuum tube oscillator by a long aperiodic line in order to frequency stabilize the oscillations generated thereby within very narrow limits. The line is used as an agent for the aperiodic transfer of alternating voltages appearing at the anode to the grid and at the same time producing a 180 degree phase change which is the correct relation for the instantaneous voltages on the plate and grid of an electron discharge device to produce oscillations.

I have described in my Patent No. 1,945,546, granted February 6, 1934, a resonant long line for frequency stabilization of a vacuum tube oscillator. In my system, the line is left open-ended or short circuited in order to produce thereon standing waves whose wave length is determined by the length of the line, which, in turn, is chosen of correct value for a predetermined frequency. The standing waves are then utilized to pull the oscillator into step therewith; and, as the length of the line in both cases is the principal factor governing the frequency of oscillations generated, the systems are extremely stable.

Further, as the percentage of the length of the lines occupied by a half wave length becomes less, or in other words as the line is made longer, frequency stabilization increases with increasing frequency—a desirable characteristic. As the lines are lengthened, however, their weight and bulk increases. Accordingly, it is an object of this invention to overcome this disadvantage and I fulfill this object by providing a mechanical line for controlling the transfer of energy from the output circuit of the device to the input circuit of the device or, for producing standing mechanical waves which in turn pull the oscillator into step therewith.

A relatively short mechanical line, either solid or fluid, because of the relatively low velocity of sound and consequently of mechanical waves therein, would contain a great number of full wave length mechanical oscillations at high frequencies. Thus, for example, a steel bar 16.7 centimeters long would have 100 wave lengths of mechanical oscillations on it at a frequency of 3,000,000 cycles per second. This would correspond to an electrical wave length of 100 meters and would, consequently, require an electrical line approximately 10,000 meters long.

As my present invention requires the use of a mechanical element either gas, liquid, or solid and preferably the latter, for frequency stabilization of an electrical oscillator, it is a further object of my invention to provide means for transforming a portion of the electrical alternating energy generated by the oscillator or generator, into mechanical energy; and, means for transforming the energy transferred by, or set up in the mechanical element into a form for controlling the frequency of oscillation of the oscillator. To accomplish the last mentioned step I propose to transform the mechanical energy into electrical energy and utilize the energy so transformed for controlling the frequency of the electrical oscillator; for example, by using it as part of the input of an electron discharge device generator of oscillations.

Still a further object of my invention is to provide means for producing any type of mechanical wave in the stabilizing mechanical element of my system so far outlined. That is, the system will operate for frequency stabilization purposes with compressional and tensional waves; or, for example, torsional mechanical waves. I may, in order to produce compressional and tensional waves, utilize piezo-electric means; and, to produce torsional mechanical waves; utilize electromagnetically a portion of the output of the oscillator.

For transforming the mechanical energy to stabilizing electrical energy to be applied preferably to the input of the oscillator I may use according to my present invention either piezoelectric, reactive or electromagnetic means.

Figure 5:
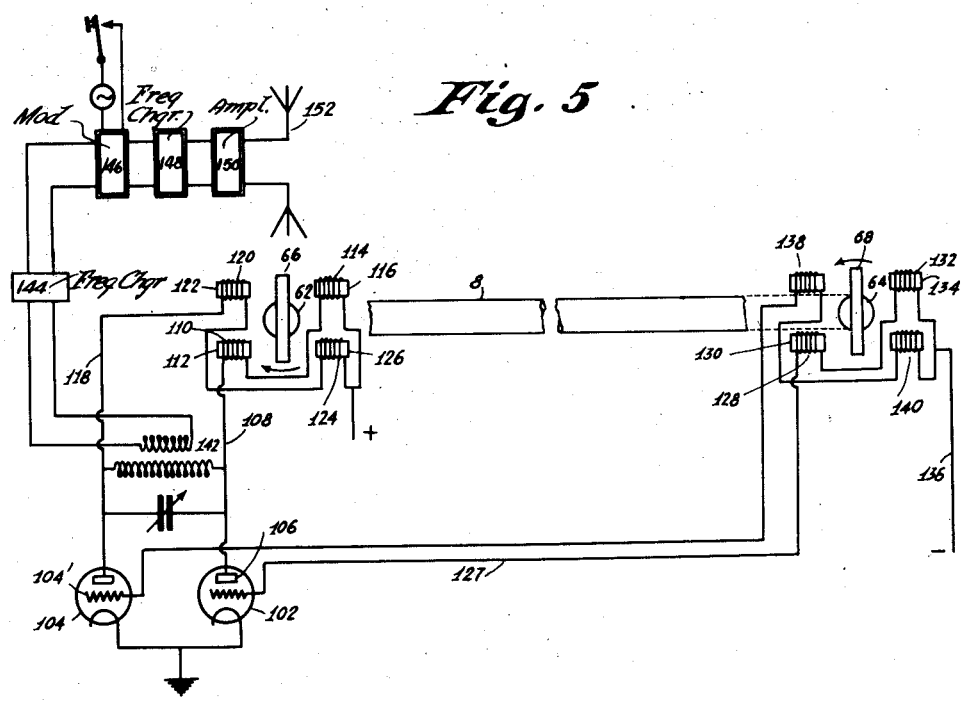

In the accompanying drawings which are only illustrative of my invention, and not to be considered as limiting it, Figure 1 indicates an oscillation system utilizing an effectively long mechanical line for frequency stabilization purposes, Figures 2 and 3 are modifications of Figure 1 wherein reactive means are utilized for transforming mechanical energy into electrical energy, and Figures 4 and 5 indicate systems utilizing torsional mechanical waves for frequency stabilization.

Turning to Figure 1 an electron discharge device 2 preferably of the screen grid type, has its anode 4 and control electrode 6 regeneratively connected, according to my invention, through a mechanical element or steel bar 8 for sustained oscillation generation. One of the conditions necessary to such oscillation generation is that the grid 6 and plate 4 oscillate in voltage substantially 180 degrees out of phase. This opposed phase relationship is obtained accurately for a predetermined frequency, and other frequencies are discriminated against by the use of bar 8 which is made effectively a whole number of half wave lengths long of mechanical waves of a frequency equal to the frequency of the electrical waves that it is desired that oscillator 2 generate.

Partially, feed back occurs from anode 4 through a conductor 10, and piezo-electric crystal 12 for which there is provided an electrode 14, connected to conductor 10, and, a grounded electrode in the form of bar 8. Application of alternating potentials causes the crystal to expand and contract in a direction along the longitudinal axis 16 of bar 8. The mechanical vibration of the crystal is in turn transferred to bar 8 which in turn reacts upon crystal 18 at the other end of the bar associated with the input electrode 6 of vacuum tube 2 through crystal 18. By cementing crystal 18 to bar 8 and also crystal 12 to bar 8, crystal 18 will be subjected to compression and tensional stresses alternately by the waves transferred by bar 8. The stresses cause potentials to appear on opposite sides of crystal 18 which are transferred in turn through conductor 22 to grid 6, thereby controlling the frequency of oscillations generated by vacuum tube 2.

To assist in the building up of oscillations at the desired frequency tuned circuit 24 is provided in the input circuit of tube 2 and tuned circuit 26 is provided in the output circuit thereof, both circuits being tuned as nearly as possible to the desired frequency of oscillation.

In order to prevent feed back through the interelectrode capacity of tube 2 a screen grid 28 is provided which is furnished with a suitable biasing potential through the action of resistance 30 and which is grounded for high frequency currents through the action of condenser 32. Suitable control electrode biasing potential is obtained by suitable choice of grid leak and condenser arrangement 34.

Output energy is taken from tuned circuit 26 and fed to a modulator and amplifier 36 supplied with modulating energy either in the form of keyed energy or other complex currents and may be directly radiated. If preferred, however, the energy so modulated may be amplified and frequency multiplied at 38, a single side band may be passed by a suitable filter 40, amplified at 42 and then transmitted by a suitable radiating antenna 44.

In order to maintain the crystals and bar in fixed relationship, the crystals and bar may be clamped between two heads 46 by means of bolts 48 and between insulating blocks 50. The bar or mechanical element 8 is suitably grounded at some point intermediate its ends such as at point 52. The bar 8, in order to provide voltages of correct phase relationship upon the grid 6 of vacuum tube 2 for sustained oscillation generation should be effectively a whole number of half wave lengths long, either odd or even depending upon the orientation of crystals 12, 18; for, the reversal of the crystal about its axis perpendicular to axis 16, will cause a reversal of voltages generated thereby and a reversal of the crystal expansive and contractive action, as is well known. For waves other than the frequency for which bar 8 is a whole number of half wave lengths long, voltages applied to the grid of tube 2 will be of incorrect phase for sustained oscillation generation and hence they will be discriminated against. The system after it has once started to oscillate at the correct frequency will continue so despite variations in load and changes in tuning.

By providing damping means in the form of a rubber block 54 at the output end of mechanical element 8 the waves set up therein will travel unidirectionally or, in other words, the bar will serve as an aperiodic transferring agent of energy from the output circuit of tube 2 to the input circuit thereof. By removing damping means 54 the mechanical waves traveling towards crystal 18 will be reflected, as a result of which, standing waves will be set up in bar 8 which waves will produce the same desired effect and pull the oscillator into step therewith, the transformation of oscillator output energy into mechanical wave energy and the transformation of the latter into electrical energy to be utilized as the input of the oscillator for controlling the frequency thereof, being similar to the action already described.

It is not necessary that the mecanical waves be retransformed into electrical energy piezo-electrically for they may be transformed reactively either by magnetic or electrostatic action as shown in Figures 2 and 3. In Figure 2, the bar 8 is permanently magnetized as a result of which oscillation of its output end 56 in proximity to coil 58 associated with the input side of tube 2 will generate voltages in the coil 58. The voltages generated are applied to the input side of the vacuum tube through a blocking condenser 55 which prevents short circuiting of the biasing potential, which may be modulated in accordance with signal energy or be simply a potential from a steady unidirectional source, applied to the grid lead 57. Here again the bar need only be effectively a whole number of half wave lengths long, the length being determined by the velocity of mechanical waves in the material used as the mechanical transfer agent. For example, the mechanical element might be made of gas in which case diaphraghms might be used at the ends of cylinders for transforming or imparting mechanical vibrations to the column of gas. A similar scheme might also be used for a liquid column, a crystal directly in contact with the liquid generating mechanical waves and, for example, a diaphragm having an electromagnet for transforming the waves at the other end of the column into electrical energy.

Also, piezo-electric means could be used at the output diaphragm to apply voltages to the input side of the tube oscillator or, as indicated, a small permanent magnet could be fastened to the diaphragm in proximity to coil 58 of Figure 2.

As a reversal of phase in voltage applied to the input side of the oscillator shown in Figure 2 is caused by an increase or decrease in the length of bar 8 by an effective half wave length or by a reversal of leads 58, mechanical element 8 may be an even number or an odd number of half wave lengths long.

For transforming mechanical energy into electrical energy or the reverse, the arrangement shown in Figure 3 may be utilized. Here, the mechanical element 8 is insulated from the ground and given a biasing potential by means of a source of potential 50. By electrostatic or capacity action, vibration of end 56 of element 8 will cause voltages to appear thereacross which are transferred through blocking condenser 55 to the input side of tube 2 causing frequency stabilization at a frequency for which the bar 8 is exactly a whole number of half wave lengths long. Here also, phase change of 180 degrees may be accomplished by increasing or decreasing in length bar 8 by an effective half wave length, or, for example, reversing the crystal.

In each of Figures 1 to 3 it is preferred that the element be vibrated piezo-electrically, for, best results can be so obtained by a minimum amount of energy taken from the output of the oscillator, thus increasing the efficiency of the system as a whole. It is possible, of course, to reactively vibrate the bar or column by permanently magnetizing or suitably biasing the column, or, in the event that the column is a fluid by suitably biasing the terminating diaphragms which should be of thin metal or a membrane coated with a conducting or magnetic surface as found desirable. Or, the diaphragms may contact, at both ends of the column, directly with crystals. As in Figure 1, standing or traveling waves may be produced upon column 8 shown in Figures 2 and 3 depending upon the damping of the bar.

In Figures 4 and 5 I have shown systems for utilizing torsional mechanical waves to stabilize the frequency of oscillation of an electrical oscillator. In Figure 4, the rod or bar 8 has been shown with its ends 62, 64 turned out for the sake of better illustration and explanation. Fastened to the ends of the bar are armatures 66, 68 pulled by springs 70 toward stops 72 as a result of which there is an initial longitudinal twist of the bar. The input circuit of electron discharge device 2' is coupled through coils 74, 76 about permanent magnets 78, 80 and tuned to the desired operating frequency by condenser 200. The output circuit of electron discharge device 2' is coupled serially with coils 82, 84 wound about respective permanently magnetized cores 86, 88 which may or may not be tuned by a condenser such as 300.

Now, when plate voltage is first turned on, or, when the cathode of tube 2' is first energized so that plate current begins to flow, coils 82, 84 are so arranged that the magnetism of cores 86, 88 is strengthened thereby pulling armature 68 towards them. A torsional wave is, accordingly, sent down bar 8 inducing voltages in coils 76, 74 which, by proper connection are caused to increase the voltage on the grid or control electrode of tube 2'. Accordingly, it should be clear that armature 68 is pulled towards cores 86, 88 until plate current of tube 2' has reached the saturation point, at which time, since there is no longer movement of armature 66, the grid voltage of tube 2' begins to drop since armature 66 slows up. As a result of this, reverse action occurs, decreasing grid voltage causing decrease in plate current until the armatures are swung to their other extreme positions.

The frequency at which this action occurs will be dependent upon the effective wave length of bar 8 which should be, for a predetermined desired frequency, an even number of half wave lengths long so that the two armatures 66, 68 oscillate cophasally. The bar may be made an odd number of half wave lengths long in which case the armatures move out of phase, and in which case coils 74, 76 should be reversed to get proper grid voltages for oscillation generation. In view of the spring return, the frequency of oscillations generated is relatively small as a consequence of which tube 2' need not be of the screen grid type, for the interelectrode capacity will be sufficiently low to present an extremely high reactance to currents of the frequency generated by the scheme illustrated in Figure 4. Accordingly, feed back will occur solely through the action of bar 8.

Output energy is derived from transformer 90 in the output circuit of tube 2' and fed to a frequency multiplier 92. The frequency multiplied energy is modulated by a modulator 94 supplied with amplified voice currents by amplifier 96. The modulated waves may then be amplified by an amplifier 98 and radiated through any suitable radiating device 100. If desired, of course, the output of transformer 90 may be directly modulated and transferred over land lines or radiated as found desirable.

In Figure 5 I have shown a system utilizing torsional mechanical waves for frequency stabilization of an electrical oscillator similar to that shown in Figure 4 but improved in the respect that electromagnetic return is provided rather than a spring return, together with the feature of a pushpull arrangement for the oscillator tubes. The bar 8 as in Figure 4, has been shown with its ends 62, 64 having armatures 66, 68 turned out.

Electron discharge devices 102, 104 are regeneratively arranged in a fashion such that the frequency of oscillations generated thereby is controlled by the length of bar 8. The anode circuit of electron discharge device 102 may be traced from anode 106 through conductor 108, coil 110 having a core 112, and coil 114 having a core 116 to the source of anode potential. The anode circuit of tube 104 may be similarly traced to the anode potential source through conductor 118, coil 120, having a core 122 and coil 124 having a core 126.

The grid or control electrode circuit of tube 102 may be traced through conductor 127, coil 128 having a magnetized core 130, coil 132, diametrically or diagonally disposed with reference to coil 128 and bar 8, having a magnetized core 134 and to conductor 136 leading to a source of biasing potential. The grid 104' of tube 104 is similarly connected to conductor 136 through the coil of electromagnet 138 and the coil of electromagnet 140, the coils being connected in series as shown.

Output energy is taken from the tuned transformer coil 142 connected across the anodes of tubes 102, 104 and fed to a frequency multiplier 144 the output of which is modulated by, for example, modulating energy in the form of keyed alternating energy at a modulator 146. Tuning of transformer 142 is required only where the rod 8 is to be operated on harmonics of its lowest natural frequency of vibration and serves the purpose of determining the particular harmonic frequency at which the oscillations take place. The output of the modulator may be again frequency multiplied at 148 and amplified if desired at a high power amplifier 150 and then transmitted over land lines or preferably radiated through a suitable radiating antenna 152.

The arrangement of the coils should be made such that, for example, in connection with tube 102, increasing anode or plate current causes increase in control electrode or grid voltage. In this manner, when the device starts up, for example, or, to take the time during the generation of steady oscillations, increase in plate current causes armature 66 to be drawn towards cores 112, 116 sending a torsional mechanical wave down the line 8. This wave reaches, and makes itself manifest in motion on armature 68 a time later determined by the length of bar 8 which preferably is made a whole number of half wave lengths long. In order to have the operation indicated, the bar 8 could be made either an even or odd number of half wave lengths long depending upon the arrangement of the coils about the end 64 of bar 8.

An arrangement preferred is that wherein the bar is made effectively an even number of half wave lengths long so that the two armatures 66, 68 move cophasally, and the coils 128, 132 are so arranged that when armature 66 is pulled towards cores 112, 116, voltages are induced in coils 128, 132 which increase the voltage on the grid of tube 102 thereby causing increased anode current flow therethrough. This action will continue until extreme movement of the armatures 66, 68 or until the saturation point of tube 102 is reached at which time due to the fact that the rate of increase of anode current becomes zero or decreases, reverse action will take place; that is, tube 104 will then begin to draw increased anode current pulling armature 66 towards cores 122, 126. The later action will, of course, cause decrease in grid potential and hence decrease in plate current flow in tube 102.

Accordingly, it will be seen that the pushpull oscillator including tubes 104, 102 is regeneratively connected through bar 108 in such fashion that a portion of the output energy of the tubes is electromagnetically transformed into mechanical energy at end 62 of bar 8. The mechanical energy is fed to a path effectively a whole number of half wave lengths long, namely, bar 8, and the mechanical energy is transformed electromagnetically at the end 64 of bar 8 into electrical energy which is fed as input energy to the oscillator 102, 104 to control the frequency of oscillations generated thereby. The frequency is accurately determined by the length of bar 8 which, as already pointed out should be effectively a whole number of half wave lengths long for the desired frequency.

By the provision of damping means in the form of a rubber pad pressing against the bar 8 transfer will become substantially aperiodic, that is to say, waves will travel unidirectionally from end 62 to end 64. The damping means may be omitted and, by suitable design of the bar, or due to its own atenuation, the transfer of mechanical energy may be aperiodic. However, even though there is reflection of mechanical energy from end 64 to end 62, which may be desired in some instances, the reflection will produce standing mechanical torsional waves on bar 8. With the latter type of waves a similar frequency stabilizing result will be obtained; for, the wave length of the standing wave is determined by the length of the bar chosen. That is, either standing or traveling mechanical waves will produce the same frequency stabilization.

For purposes of illustration only it may here be mentioned that the range of operating frequencies of the systems shown in Figures 1 to 3 may extend from a maximum of about 20,000,000 cycles down to very low frequencies. Depending upon the length of the bar in the mechanical oscillator it is possible to go down as low as one cycle per second, although for practical purposes it is thought best not to go below 500 cycles per second. As regards the arrangements of Figures 4 and 5, however, the most suitable operation should be in the frequency range from about 20,000 cycles down to very low frequencies of the order of one cycle per second, the frequencies, of course, being determined by natural periods of the bar vibrating torsionally. These ranges of frequencies, it is to be understood, are not to be taken as limitative of the invention.

Having thus described my invention, what I claim is:

1. In apparatus for transforming direct energy to alternating energy, said apparatus including a vibrator whose length is effectively a whole number of half wave lengths of its fundamental frequency, the method of generating alternating energy of predetermined frequency which is determined by the length of said vibrator which includes producing, with a portion of the transformed direct energy taken from the apparatus, traveling mechanical waves along the length of said vibrator at the predetermined frequency, transforming the mechanical waves to waves of electrical energy and feeding the electrical energy so derived to the apparatus to control the frequency of the alternating energy generated.

2. In apparatus for transforming direct energy to alternating energy, said apparatus including a mechanical vibrator whose length is effectively a whole number of half wave lengths of its fundamental frequency, and piezo-electric apparatus connected to said vibrator, the method of generating energy of predetermined frequency determined by the length of said vibrator which includes producing piezo-electrically, with a portion of the transformed direct energy taken from the output of the apparatus, traveling mechanical waves along the length of said vibrator, transforming the mechanical waves to waves of electrical energy, and feeding the electrical energy so derived as input energy to the apparatus.

3. The method of generating oscillations of predetermined frequency in apparatus having an electron discharge device and a mechanical vibrator connected to said device which includes transforming a portion of the electrical output of the device into traveling mechanical waves of a frequency which is determined by the length of the mechanical vibrator, transforming the mechanical waves into electrical energy, and feeding the electrical energy so derived to the input side of the device.

4. In combination, an electrical oscillation generator, a mechanical element for controlling the frequency thereof, means for producing, in the element, mechanical traveling waves with a portion of the electrical output of the generator of a frequency which is determined by the length of said element, piezo-electric means for retransforming the mechanical waves into electrical waves, and means for feeding the electrical waves so derived to the input circuit of the generator.

5. In combination, an alternating current generator, a mechanical element constructed to produce mechanical waves of a frequency determined by the length of said element for controlling the frequency thereof, piezo-electric crystals at each end of the mechanical element, damping means at one end of said element and intermediate said piezo-electric crystals, means for coupling one of said crystals to the output circuit of the generator, and means for coupling the other crystal to the input circuit thereof.

6. In combination, a screen grid vacuum tube oscillator, and a metallic rod associated with the input and output circuits thereof for controlling the frequency of oscillations generated thereby, a piezo-electric crystal at one end of the rod coupled to the output circuit of the device for impressing mechanical vibrations upon the rod to produce mechanical waves therein, a piezo-electric crystal at the other end of the rod to transform mechanical waves delivered by the rod into electrical energy, a rubber damping element at said other end of the rod for preventing reflection of the mechanical waves and means for feeding the electrical energy so derived to the input side of the screen grid tube.

7. In apparatus having, in combination, an electron discharge device and a mechanical vibrator connected thereto, and damping apparatus at one end of said vibrator, the method of generating oscillations of predetermined frequency which includes transforming a portion of the electrical output of the device into traveling torsional mechanical waves of a frequency which is determined by the length of said vibrator, transforming the mechanical waves into electrical energy, and feeding the electrical energy so derived to the input side of the device.

CLARENCE W. HANSELL.